Sept. 3, 1963        S. R. ZIMMERLEY        3,102,806
REVERBERATORY SMELTING METHOD AND APPARATUS
Filed June 10, 1958        2 Sheets-Sheet 1
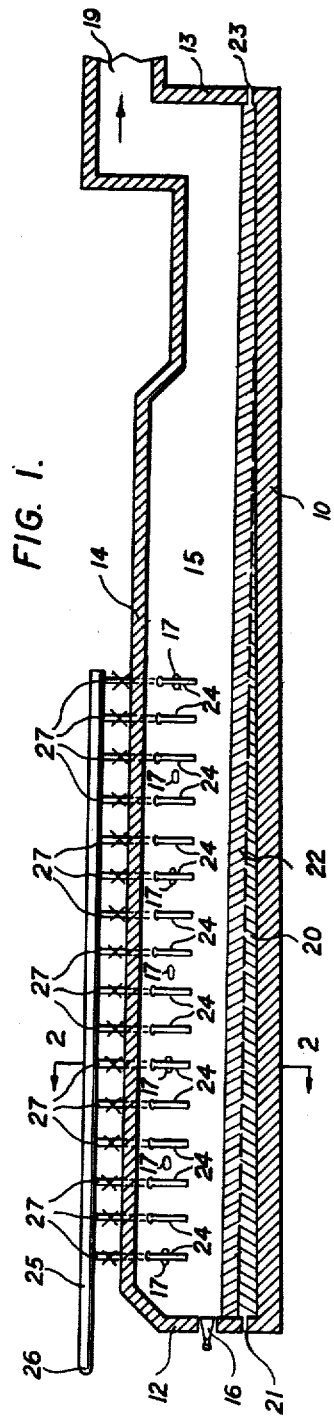
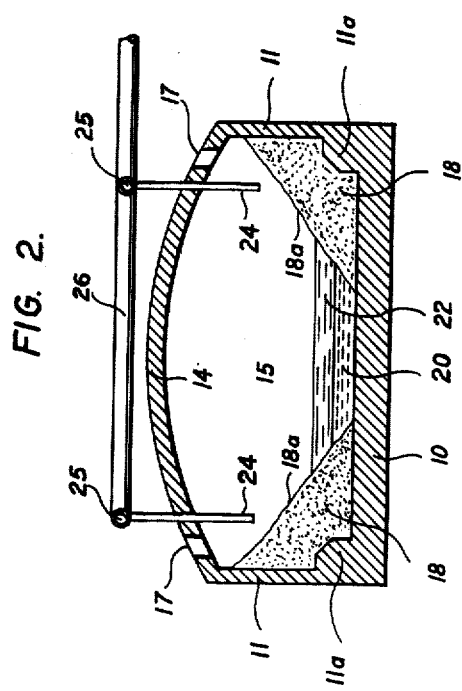
INVENTOR:
STUART R. ZIMMERLEY,
BY *Mallinckrodt*
*& Mallinckrodt.*
ATTORNEYS.

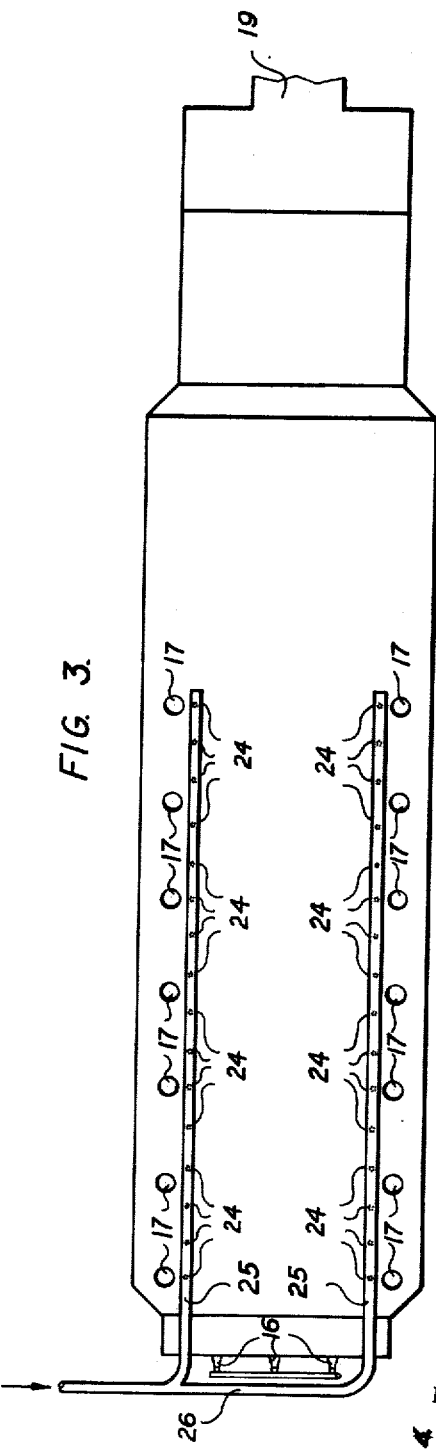

United States Patent Office 3,102,806
Patented Sept. 3, 1963

---

3,102,806
REVERBERATORY SMELTING METHOD AND APPARATUS
Stuart R. Zimmerley, Salt Lake City, Utah, assignor to Kennecott Copper Corporation, New York, N.Y., a corporation of New York
Filed June 10, 1958, Ser. No. 741,113
5 Claims. (Cl. 75—74)

This invention relates to methods of and apparatus for smelting ores, and is particularly concerned with improvements on existing reverberatory smelting methods and furnaces.

Reverberatory furnaces are extensively employed for the smelting of copper sulfide ores and ore concentrates. In such a furnace, flames and gases from a fuel burner directed into one end of an elongate hearth chamber are passed over and along the length of the hearth. The ore material to be smelted is charged into the furnace at and along mutually opposite, longitudinal, side walls thereof, from above and at such intervals along the length of the hearth as are effective to provide banks of the charged material which extend continuously along much of the length of the hearth from the firing end and at the respective sides of the furnace. These banks slope downwardly and inwardly of the hearth chamber as fettling, protectively covering the side walls of the furnace against smelting heat radiated onto the charge from a refractory roof above the hearth, as well as from molten material produced and collected in the furnace.

The exposed and downwardly sloping surfaces of the banks of charged raw material are melted by such radiated heat, the molten material running down in rivulets onto the hearth, where copper and iron sulfides sink to the bottom of the molten mass, as so-called matte, and gangue materials rise to form a slag.

In addition to the melting of superficial areas of the charge, some sulfur is burned off. This has an important effect upon the grade of the matte produced. In fact, it is common practice to give the raw ore materials a preliminary calcining treatment in roasters in order to permit the production of a higher grade matte and the slagging of more of the iron during the reverberatory treatment. This is usually necessary because the amount of sulfur that can be burned off from the side wall banks of charged ore material in standard reverberatory practice is very limited.

The ore and ore concentrates used for copper smelting consist mainly of copper and iron sulfides, together with some oxides, gangue, and some impurities, such as arsenic. During preliminary roasting, sulfur is eliminated as $SO_2$ and some of the iron sulfide is oxidized, so that the calcine obtained is a mixture of oxides, sulfides, and possibly sulfates. Typical reactions which occur during roasting at temperatures of 300 to 800° C. are:

$$4CuFeS_2 + 13O_2 \rightarrow 4CuO + 2Fe_2O_3 + 8SO_2 \quad (1)$$

$$Cu_2S + 2O_2 \rightarrow 2CuO + SO_2 \quad (2)$$

$$2Cu_2S + 3O_2 \rightarrow 2Cu_2O + 2SO_2 \quad (3)$$

In the subsequent reverberatory smelting treatment, the copper compounds of the calcine from the roaster are converted to cuprous sulfide, and part of the iron sulfides present are oxidized to ferrous oxide. Typical reactions which occur in the reverberatory smelting furnace are:

$$2CuO + 2FeS_2 + O_2 \rightarrow Cu_2S + SO_2 + 2FeO \quad (4)$$

$$Cu_2O + FeS \rightarrow Cu_2S + FeO \quad (5)$$

$$FeS_2 + 5Fe_2O_3 \rightarrow 11FeO + 2SO_2 \quad (6)$$

Magnetite may also be formed by the oxidation of some of the FeO:

$$6FeO + O_2 \rightarrow 2Fe_3O_4 \quad (7)$$

When the ore and ore concentrates are fed to the reverberatory furnace directly, the following reactions occur:

$$4CuFeS_2 + 5O_2 \rightarrow 2Cu_2FeS_2 + 4SO_2 + 2FeO \quad (8)$$

$$Cu_2S + FeS_2 + O_2 \rightarrow Cu_2FeS_2 + SO_2 \quad (9)$$

$$6FeO + O_2 \rightarrow 2Fe_3O_4 \quad (10)$$

$$4FeO + O_2 \rightarrow 2Fe_2O_3 \quad (11)$$

$$FeS_2 + 5Fe_2O_3 \rightarrow 11FeO + 2SO_2 \quad (12)$$

and the ferrous oxide reacts as follows with silica, which has been added as a flux:

$$FeO + SiO_2 \rightarrow FeSiO_3 \quad (13)$$

The matte formed as a reaction product is a mixture of copper and iron sulfides. Its grade is a function of the amount of sulfur eliminated in the roasting and/or smelting steps.

In accordance with the present invention, it has now been found that both the roasting and smelting reactions taking place on the exposed slopes of the banked charge are greatly enhanced if additional oxygen in the form of air, oxygen-enriched or essentially pure oxygen is blown onto such slopes after they have become hot and reactive from the customary reverberatory procedure.

Increase in the relative proportion of oxygen to air produces a corresponding increase in the rate of the reactions. Impingement of an oxygen-supplying fluid stream against the hot charge raises the temperature thereof significantly, and smelting heat is evolved directly in the area where the smelting is taking place, rather than being reflected from the roof, as in customary practice.

As a consequence, preliminary roasting of the ore material is unnecessary and much higher than customary temperatures are possible for smelting purposes, without endangering the furnace structure. Localization of the smelting heat within and largely superficially of the banked charge means that the available heat is used to best advantage and is kept from damaging the refractory roof of the furnace. Moreover, advantage is still taken of the insulating value of the banked charge, itself, in protecting the side walls of the furnace from the smelting heat and from contact by the molten matte and slag.

While it is realized that the inherent quiescence of a reverberatory furnace is a well recognized advantage in the smelting of finer ore materials, such as flotation concentrates, as is, also, the maintenance of quiescence in the pool of molten matte and slag on the hearth below the reverberatory flame, it has been found that the blowing of oxygen—whether as such, or in the form of oxygen-enriched air—onto the banked and sloping charge does not result in serious dusting away of material or undesirable turbulence, if the superficial area of such charge is first brought to stickiness or semi-fluidity in the usual manner by reverberatory heat; nor, under such circumstances, is there any undue effect on the molten matte and slag. On the contrary, the molten slag covering the matte and through which the values must pass is exceptionally fluid, thereby minimizing the loss of prills of matte, which, in normal practice, tend to be caught and held in the slag. Moreover, a reverberatory gas richer in sulfur and suitable for the production of sulfuric acid is obtained.

Other advantages of the method are:

(1) Increased melting rate.
(2) Control of the grade of matte, including the elimination of more sulfur and the slagging of more iron during the smelting stage.

(3) Evolution of the heat required for smelting directly at the place where the important part of the smelting takes place.

(4) Lesser consumption of carbonaceous fuel in the reverberatory burners.

(5) Production of a smaller amount of gas and entrained dust for passing to waste or for returning to the furnace.

(6) A versatile smelting operation, whereby large variations in the composition of the feed can be accommodated by the degree of oxygen-enrichment of or the number of streams directed against the charge.

Further objects and features of the invention will become apparent from the following detailed description taken in conjunction with the accompanying drawings.

In the drawings:

FIG. 1 is a somewhat schematic showing of a typical reverberatory furnace equipped with a preferred specific form of the improvement of the invention, the view being a central, longitudinal, vertical section;

FIG. 2, a transverse vertical section taken along the line 2—2 of FIG. 1; and

FIG. 3, a top plan.

Referring to the drawings:

The reverberatory furnace illustrated is typical of those employed in modern smelting practice as applied to copper ore materials, and embodies a representative form of the apparatus improvement of this invention. As such, it is capable of carrying out the present method to advantage.

Such furnace comprises an elongate hearth 10 enclosed by a pair of mutually opposite, longitudinal, side walls 11, end walls 12 and 13, and an arched refractory roof 14, which form a correspondingly elongate hearth chamber or reverberatory chamber 15, within and along which flames and gases from a burner 16 are passed. The burner may be fired by any suitable fuel, usually gas, oil, or pulverized coal. As shown, it extends through end wall 12.

The ore material to be smelted is charged into the furnace through a series of ports 17 in the roof 14 and arranged at intervals along each of the side walls 11. The charging is carried out in customary manner by means of bins or hoppers (not shown) replenished by a traveling bin car or conveyor system (not shown).

The longitudinally extending side walls 11 are formed with respective ledges or shelves 11a upon which the ore material is charged and from which it spills to form respective fettling banks 18 of ore material extending continuously along and protectively covering such side walls of the furnace against smelting heat radiated downwardly within the reverberatory chamber 15 by roof 14. The banks 18 slope downwardly to hearth 10 at the natural angle of repose of the charged ore material, see FIG. 2, and present superficial areas 18a to the radiated heat. Spent combustion gases pass out of the reverberatory chamber by flue 19.

The furnace as so far described is entirely conventional in its construction. If operated in the usual manner, smelting heat radiated from the arched roof 14 would melt superficial portions of the banked charge 18, the molten material running down onto the hearth 10 and collecting there as a pool maintained in a molten state by the radiated heat, the copper and iron sulfides sinking to the bottom of the molten mass to form a so-called matte 20, to be tapped at 21, FIG. 1, and the gangue materials rising to form a slag 22, to be tapped at 23, FIG. 1.

In accordance with the invention, however, a series of injection tubes 24 depend through the furnace roof 14 and into reverberatory chamber 15 from a supply header 25 at each of the longitudinal sides of the furnace, such tubes terminating short of the respective fettling banks 18 and being directed against the superficial areas 18a thereof, preferably adjacent the intersection of such areas with the molten slag 22.

The header 25 is connected, advantageously through common piping 26, FIG. 3, with a valved supply of oxygen-enriched air or oxygen under suitable supply pressure determined by operating conditions. Individual valves 27 in the respective injection tubes 24 permit close regulation of the supply of oxygen to the superficial areas 18a of the charge.

In carrying out the method, such superficial areas 18a of the charge are first brought to preferably red heat in the usual manner, whereupon the oxygen is turned on and the reverberatory burner cut down to supply only enough heat to keep the matte and slag molten. In some instances the burner may be shut down entirely.

The oxygen generates intense smelting heat right at the charge itself, and effects an unusually rapid production of matte and slag. The intensely hot and molten material running down into the molten mass collected on the hearth insures maximum fluidity of the slag and minimum retention of matte prills therein.

Burning of sulfur and oxidation of iron in the charge proceeds at a rate much accelerated over the ordinary, and makes it possible to eliminate the usual preliminary roasting of the raw ore material.

The volume of oxygen supplied per unit time may vary considerably depending upon the character of the ore material and conditions within the furnace. Regulation of the supply is easily accomplished by adjustment of the valves 27 from time to time on the basis of observed conditions within the furnace and analysis of the matte and slag in the usual manner.

Current practices of using oxygen or oxygen-enriched air to promote combustion in a fluidized system, for example, wherein such oxygen, the copper-bearing material, and fluxes are blown into a reverberatory furnace through a nozzle, are acknowledged. However, there, the heat of the reaction is released throughout the entire furnace, and special furnace construction is required to withstand the excessively high temperature involved. Moreover, the ore material feed must be dried first, and considerable quantities of the ore particles are carried out with the spent gases.

Also acknowledged are practices of using oxygen in the open hearth refining of steel. However, there, the oxygen is either introduced into the atmosphere of the furnace to promote combustion and furnace heat, or is introduced directly into the molten metal under the relatively thin covering layer of slag. This results in a most vigorous and turbulent reaction, which is highly desirable there, but which would be entirely inappropriate and undesirable, if not highly hazardous, in the reverberatory practice with which this invention is concerned.

In the present method, the oxygen-carrying stream impinges on an ore charge before it has entered the slag or matte phase and while the exposed surface, only, is approaching the semi-liquid.

Whereas this invention is here illustrated and described with respect to preferred specific practice and apparatus, it is to be understood that various modifications and alterations may be resorted to by those skilled in the art without departing from the essential inventive concepts disclosed and claimed herein.

I claim:

1. In a reverberatory method of smelting copper sulfide ore materials to produce copper matte, wherein such an ore material in discrete solid form is charged into a reverberatory furnace along mutually opposite, longitudinal side walls thereof, as a banked fettling for said side walls, and is heated by radiation from the roof of said furnace while flames and gases are passed above and along the hearth of the furnace from fuel introduced at one end thereof, the improvement comprising blowing directly against exposed and heated surfaces of said banked fettling oxygen in sufficient concentration to generate, by oxidation of oxidizable constituents of the banked fettling, smelting heat thereat of temperature significantly greater than that resulting from combustion of said fuel, whereby smelting of the ore material is accelerated without endangering the furnace structure; and continuing said blowing of oxygen substantially throughout the smelting operation.

2. The improvement of claim 1, wherein said exposed surfaces of the banked fettling are heated, as specified, by means of reverberatory heat radiated in the usual manner from the roof of the furnace and wherein said reverberatory heat is cut down upon the blowing of oxygen against the charge.

3. The improvement of claim 1, wherein the oxygen is blown against said surfaces in a multiplicity of streams, which impinge the charge near the intersection thereof with molten slag on the hearth.

4. The improvement of claim 1, wherein the oxygen is supplied by oxygen-enriched air blown on the charge.

5. The improvement of claim 1, wherein the oxygen is essentially pure oxygen.

References Cited in the file of this patent

UNITED STATES PATENTS

| | | |
|---|---|---|
| 820,134 | Riveroll | May 8, 1906 |
| 1,862,741 | Engblom | June 14, 1932 |
| 2,078,348 | Simpson | Apr. 27, 1937 |
| 2,740,710 | Johannsen | Apr. 3, 1956 |

UNITED STATES PATENT OFFICE
CERTIFICATE OF CORRECTION

Patent No. 3,102,806

September 3, 1963

Stuart R. Zimmerley

It is hereby certified that error appears in the above numbered patent requiring correction and that the said Letters Patent should read as corrected below.

Column 2, line 27, for "air, oxygen-enriched or essentially pure oxygen is blown" read -- oxygen-enriched air or essentially pure oxygen is blown --.

Signed and sealed this 25th day of February 1964.

(SEAL)
Attest:

ERNEST W. SWIDER

Attesting Officer

EDWIN L. REYNOLDS

Acting Commissioner of Patents